(No Model.)
W. D. WALSH & J. A. DOWLING.
SUBMARINE GRAPPLE.
No. 480,640. Patented Aug. 9, 1892.
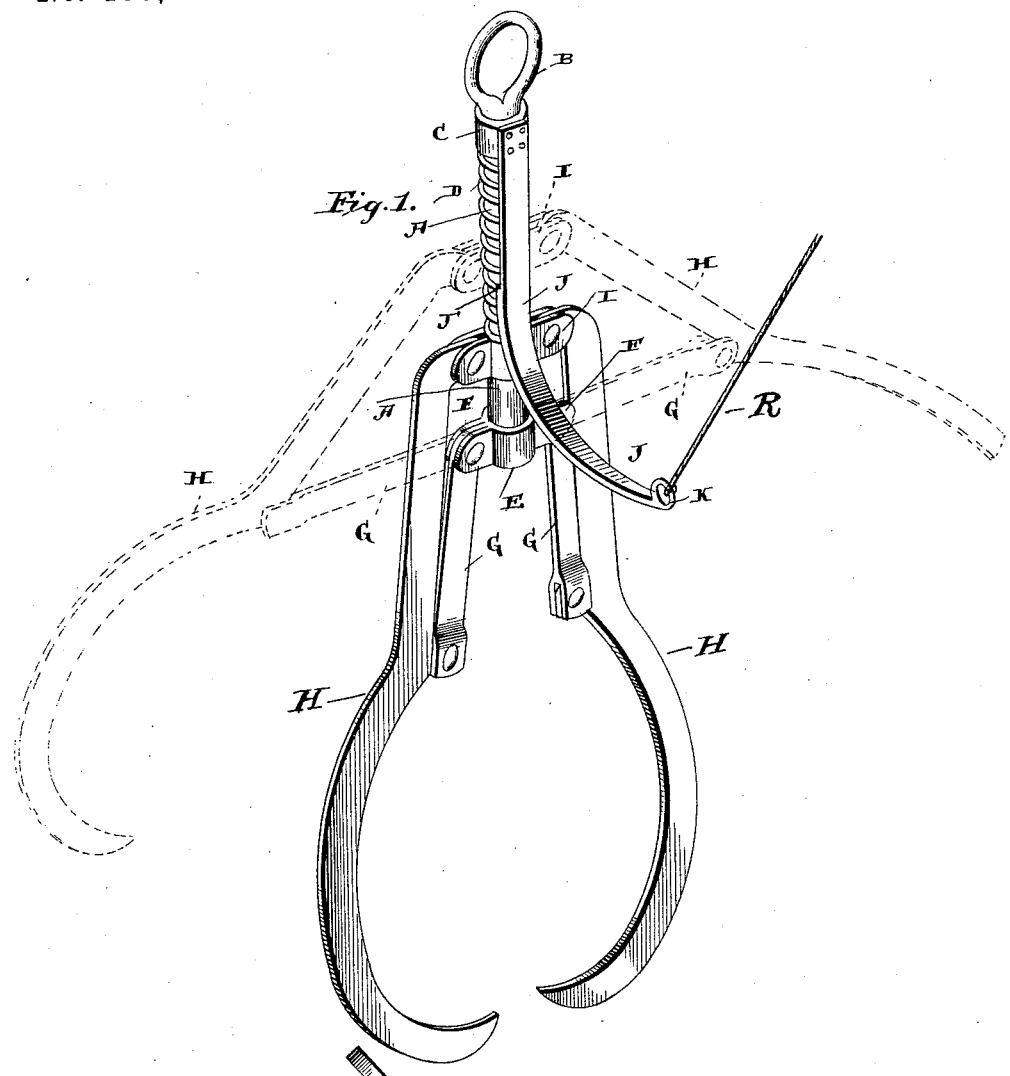
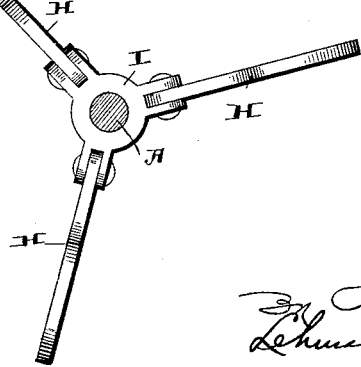

UNITED STATES PATENT OFFICE.

WILLIAM D. WALSH AND JOHN A. DOWLING, OF DULUTH, MINNESOTA.

SUBMARINE GRAPPLE.

SPECIFICATION forming part of Letters Patent No. 480,640, dated August 9, 1892.

Application filed April 11, 1892. Serial No. 428,703. (No model.)

*To all whom it may concern:*

Be it known that we, WILLIAM D. WALSH and JOHN A. DOWLING, of Duluth, in the county of St. Louis and State of Minnesota, have invented certain new and useful Improvements in Submarine Grapples; and we do hereby declare the following to be a full, clear, and exact description of the invention, such as will enable others skilled in the art to which it pertains to make and use it, reference being had to the accompanying drawings, which form part of this specification.

Our invention relates to an improvement in submarine hooks; and it consists in the novel features of construction, which will be fully described hereinafter, and more particularly referred to in the claims.

The object of our invention is to provide an improved means for grappling and raising rocks and other objects which may form obstructions to navigation.

Referring to the accompanying drawings, Figure 1 is a perspective view of our improved grapple. Fig. 2 is a plan view of a modification of the same.

A represents the center post or stem of the grapple, which is provided with a lifting-ring B at its upper end. Immediately beneath the said ring is secured the cushion-collar C. Secured at its upper end to this collar is the coiled spring D, which depends around the stem A, as shown.

Secured to the lower end of the stem is the collar E, and projecting therefrom are the bearings F, and pivoted to the said bearings are the arms or links G.

H H represent grapple-hooks, which are pivoted at their upper ends to the head I, which moves vertically on the stem A. These hooks are pivoted between their ends to the outer ends of the arms G. Thus it will be seen that when the head I is raised vertically the lower ends of the hooks H H will be thrown outward by the arms G, as shown in dotted lines in Fig. 1. The head I in its vertical movement engages the spring D, and the latter must be compressed in order to allow the grapple-arms to spread open. Consequently the arms are held normally closed, and a secure hold is thus afforded on the object being raised.

J represents a spring-arm, which is secured at its upper end to the collar C and which is provided with a notch J' between its ends, which engages the head I when the latter is in a raised position. By this means the arms of the grapple are held open; but as soon as released from the said spring they are immediately closed by the action of the spring D. The lower end of the spring J is curved outward, as shown, and provided with a ring K. When the grapple is being moved about in the neighborhood of obstructions and is let down over a rock or other object, the said spring is pushed outward, releasing the head I and closing the grapple-hooks around the obstruction.

The ring at the lower end of the spring-arm is for the purpose of attaching thereto an operating line or rope R, which may be employed to trip the grapple at any desired point by simply exerting an upward pull thereon.

The grapple is ordinarily constructed with but two hooks; but when it is desired to grapple or raise objects of irregular form three or more hooks may be employed, the modification illustrated by Fig. 2 showing the former number.

Having thus described our invention, we claim—

1. In a grapple, the combination, with a stem and a spring-actuated head moving thereon, of grapples pivoted at their upper ends to the said head and arms pivotally secured at their inner ends to the stem and at their outer ends to the said grapples between their ends, substantially as shown and described.

2. In a grapple, the combination, with a stem, a collar secured thereto, a spring secured at its upper end to said collar and depending around said stem, a vertically-moving head, grapples pivoted at their upper ends thereto, and arms pivotally connected at their inner ends to the stem and at their outer ends to the said grapples, of a depending plate-spring secured at its upper end to the collar and provided with a notch between its ends where it engages said head, substantially as shown and described.

3. In a grapple, the combination, with a stem, a head adapted to move vertically thereon, grapples pivotally connected to said head, and means for spreading or opening said grapples, of a spring which depends from the upper end of the stem for the purpose of holding the said head in a raised position, substantially as shown and described.

4. In a grapple, the combination, with a stem, a vertically-moving head thereon, grapple-arms pivotally secured thereto, and a means for spreading the said arms, of a spring depending from the upper end of the stem, which spring is notched, so as to engage the said head when in a raised position, the lower end of the said spring being curved outward, and an operating-line secured thereto, substantially as shown and described.

In testimony whereof we affix our signatures in presence of two witnesses.

WILLIAM D. WALSH.
JOHN A. DOWLING.

Witnesses:
AUSTIN N. MCGINDLEY,
LEO BALL,
MARY L. MCGINDLEY.